Figure 1:
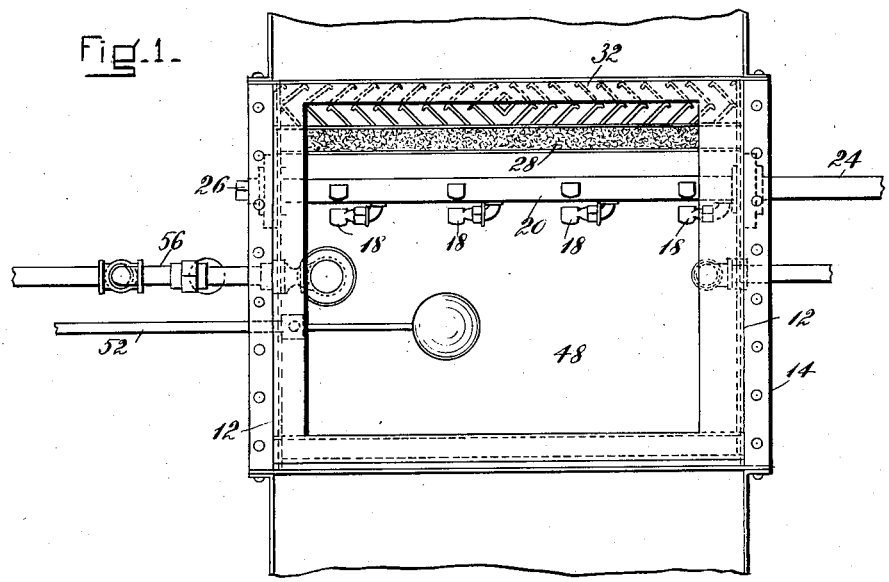

Nov. 21, 1933.  S. M. ANDERSON  1,936,243
APPARATUS FOR CONDITIONING AIR
Filed Sept. 26, 1929  2 Sheets-Sheet 1

INVENTOR:
Samuel M. Anderson
BY Van Evera, Fish, Hildreth & Harry
ATTORNEYS:

Nov. 21, 1933.    S. M. ANDERSON    1,936,243
APPARATUS FOR CONDITIONING AIR
Filed Sept. 26, 1929    2 Sheets-Sheet 2
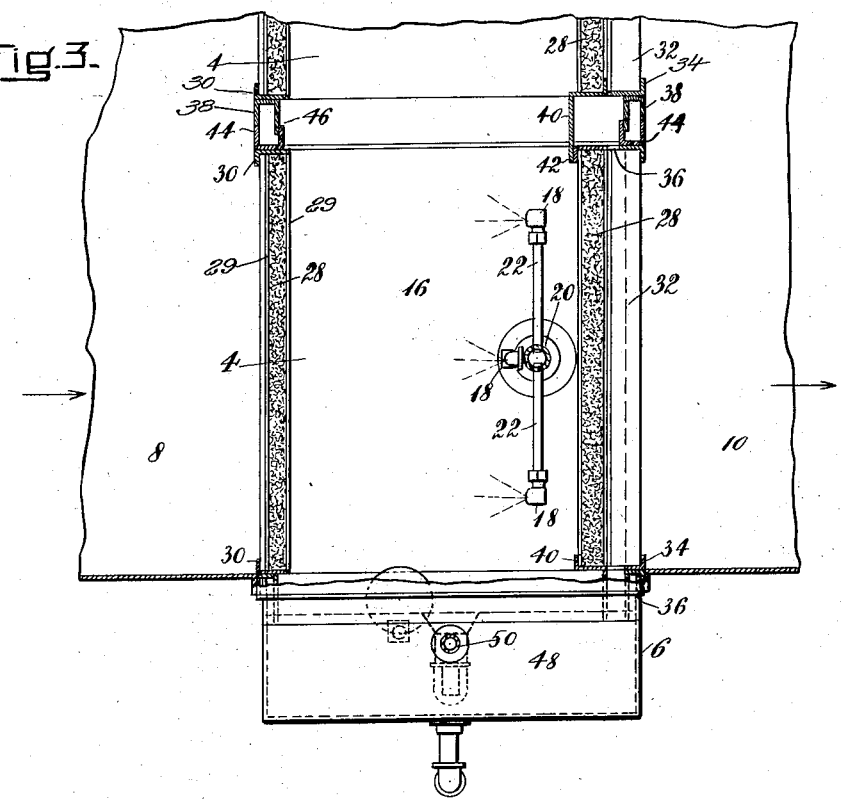

Patented Nov. 21, 1933

1,936,243

UNITED STATES PATENT OFFICE 1,936,243

APPARATUS FOR CONDITIONING AIR

Samuel M. Anderson, Sharon, Mass., assignor to B. F. Sturtevant Company, Hyde Park, Mass., a corporation of Massachusetts Application September 26, 1929
Serial No. 395,402

3 Claims. (Cl. 183—9)

The present invention relates to methods and apparatus for conditioning air and more particularly for the dehumidifying and cooling of the same.

One of the objects of the present invention is to provide a method whereby moisture may be removed from the air or the temperature of the air reduced in an efficient and economical manner.

Another object is to devise an apparatus for carrying out this method which apparatus shall be of simple and inexpensive construction, have small dimensions, and operate in an economical and efficient manner.

With these objects in view the present invention consists in the method and devices and combinations of devices hereinafter described and more particularly defined in the claims.

Heretofore in the de-humidifying and cooling of air it has been found necessary to provide a chamber of long dimension through which the air to be de-humidified and cooled was passed. Cold water or other cooling fluid was sprayed into the current of air flowing through this chamber and absorbing heat from direct contact with the air, reduced the temperature of the latter. In this form of apparatus it was necessary not only to provide a chamber of great length in order to permit the water to remain in contact with the air as long as possible, but it was also necessary to use a large quantity of water to secure even a moderate reduction of temperature.

While this water was used over and over again, the large amount which was required made necessary large and bulky apparatus for handling it and entailed heavy expense for pumping. The present method and apparatus involves the use of a very short chamber and much smaller water handling parts, and also greatly reduces the amount of water or other cooling liquid required. These results are accomplished by the use of a screen or filter, preferably one at the air inlet and another at the air outlet, which catch the spray of cold water and give up heat thereto, they in turn absorbing heat from the passing air. Thus the air is cooled not only by the direct action of the cold water, but also by contact with the cool surfaces of the screens or filters which are kept at a low temperature by the cold water spray. The cooling of the air is thus accomplished in a very effective manner with the use of a much smaller apparatus and a greatly reduced volume of water, with a corresponding economy in installation and operation.

Figure 2:
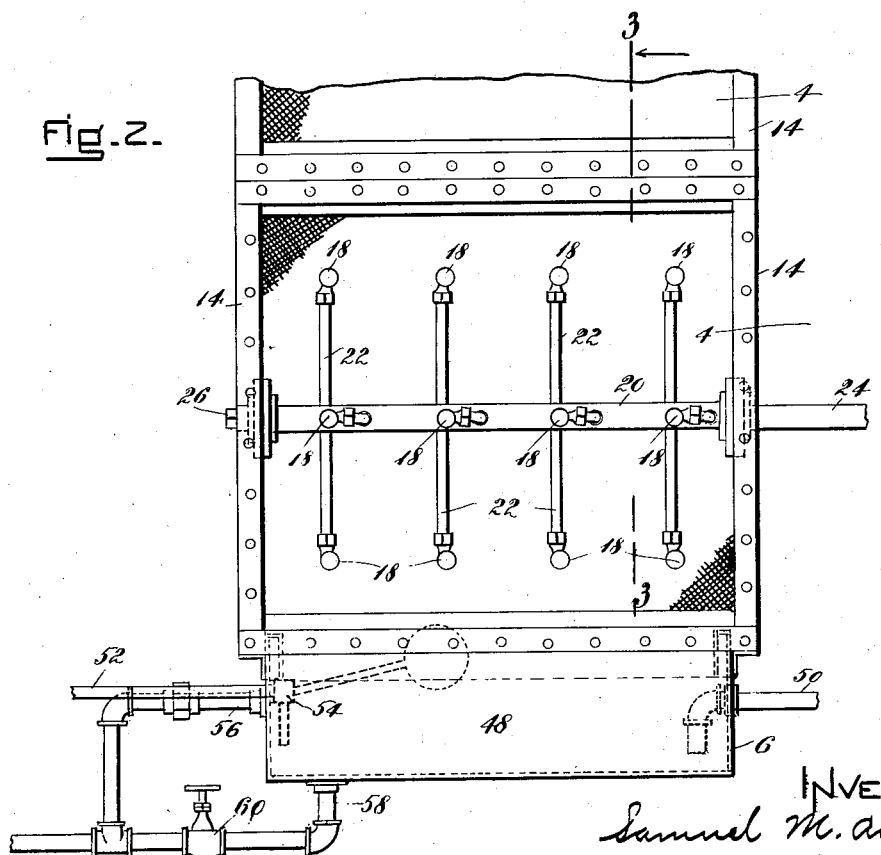

In the accompanying drawings which illustrate what is now considered the preferred form of the present inventions, Fig. 1 is a top plan view of a de-humidifier and cooling unit embodying the present inventions; Fig. 2 is a front view of a bottom unit and a portion of the unit next above, looking into the air inlets and with the inlet screens or filters removed; and Fig. 3 is a view looking to the left in Fig. 2, partly in section on line 3—3 and partly in elevation.

The present invention is shown as embodied in a construction or apparatus which is built up of units in the proper number to provide the desired capacity. In the drawings is shown one complete unit and a portion of another to indicate the manner in which the units are assembled.

As shown best in Fig. 3, the apparatus comprises one or more spray units 4, vertically disposed one above another with a collecting tank unit 6 at the bottom. The air to be conditioned is supplied through the inlet duct 8 of proper dimension to embrace the inlets of all of the spray units 4. An outlet duct 10 of similar suitable dimension to embrace all the outlets receives the de-humidified and cooler air from all of the spray units and carries it away. The side walls 12 of the spray units 4 are preferably formed of sheet metal with suitable side, top, and bottom flanges 14, for connection to the air duct and to the superposed unit, top closure, or bottom collecting tank unit, as the case may be.

Each spray unit comprises a spray chamber 16 within which are located the spraying devices consisting of a series of nozzles 18. Cold water or other cooling liquid is supplied to the nozzles through the main pipe 20 and the vertical branch pipes 22. The water may be supplied to either end of the main pipe 20 by a supply pipe 24, the opposite end being closed by a plug 26.

The spray chambers are open at their front to receive the inlet air and are similarly open at their back to discharge the outlet air, and in each opening is positioned a filter or screen 28. Each screen comprises a front and back wall, preferably of expanded metal or other similar open character, between which is held metal wool, such as copper or rustless steel. These screens or filters are provided at their top and bottom with the angular metal strips 30 to which the front and rear expanded metal walls are secured.

An eliminator 32 of common form is mounted in the outlet opening of each chamber behind the outlet screen in order to catch and remove from the air any droplets or particles of water carried through the outlet screen.

The plates of the eliminator are secured to top and bottom angle metal strips 34 which are of reduced width horizontally so as to provide a transverse slot or opening 36 for the downward passage of the water collected by the eliminator from one unit to another and finally to the collecting tank at the bottom of the apparatus. The bottoms of the inlet and outlet openings are formed of inverted U-shaped sheet metal pieces 38, which support the inlet filter 28 and the eliminator 32. The outlet filter is supported upon a Z-shaped sheet metal piece 40 which extends downwardly a sufficient distance to overlie the top of the next lower outlet filter at 42 to prevent the escape of air between the adjacent filters, or to reach beneath the surface of the liquid in the tank to prevent the escape of air beneath the lowest filter.

The tops of the inlet and outlet openings of the units are formed by the U-shaped metal pieces 44, with which the inverted U-bars of the unit next above contact with their inner edges overlapping as at 46. The joint here is preferably soldered.

The collecting tank unit 6 at the bottom of the apparatus is provided with a tank 48 to catch the water which falls from the spray chambers 16 and also whatever water may be caught by the eliminators 32. The water is drawn from the tank for recirculation through the outlet pipe 50 with down-turned end. A supply pipe 52 with float controlled valve 54 co-operates with the overflow 56 to maintain a constant water level in the tank. A drain 58 and valve 60 are provided for emptying the tank when desired.

The above described apparatus will ordinarily be used with refrigeration and a recirculating pump, the cooling water being used over and over again with refrigeration in each cycle, any loss of water due to evaporation or leakage being automatically made up from the supply controlled by the float valve and any surplus of water, as from condensation, being disposed of through the overflow.

The spray water will be cooled by some suitable cooling apparatus, such for example as any of the common refrigeration systems employing ammonia or similar compressible gas. Where a relatively low temperature of the cooled air is required, as for de-humidifying air, a non-freezing solution of calcium chloride or other suitable material will be used instead of clear water.

Where a large supply of water at low temperature is available, it may be pumped through the apparatus once and then thrown away, carrying the absorbed heat with it.

In the operation of the above described apparatus the water supply being turned on, the tank in the bottom unit will fill to the proper level which will be maintained by the float valve. The circulating water pump is now set in operation and also the fans or other draft producing devices. The air to be cooled or de-humidified passes from the inlet duct through the inlet screens across the spray chamber, through the outlet screens, over the eliminators and through the outlet duct. In the meantime cold water or brine solution has been sprayed from the nozzles into the air current, cooling the air by direct contact. The larger particles of cooling liquid are discharged with sufficient velocity to reach the inlet screen which they strike with such force that they are immediately broken up into still finer spray, some of which remains upon the screen while the rest is carried back through the spray chamber by the air current, absorbing more heat therefrom by direct contact.

A portion of the spray falls downwardly through the chamber and is collected in the tank at the bottom. Still another portion of the spray is carried back by the air current and onto the outlet screen, heat being absorbed from the air by the direct contact through this movement.

The cold water which impinges upon the inlet screen and that which is carried by the air current onto the outlet screen absorbs heat from the metal wool or other material of which the screens are composed, reducing the temperature thereof. Although probably the cold water does not penetrate the inlet screen to any substantial extent, nevertheless, due to the heat conductivity of the material composing this screen, the entire mesh of the screen will be reduced in temperature and in turn will become effective to cool the air flowing through it. With such material as metal wool forming the screen, the air flowing through the cellular interstices thereof will be broken up into a multiplicity of minute air currents which will be of relatively high velocity, thereby securing a rapid heat transfer from the air to the screen and to the water entrained in the screen.

Such water as is caught by the screen, which in the case of the outlet screen will be considerable, will not only absorb heat from the screen but, being exposed to the air, will absorb heat directly therefrom. As the water collects on the inlet and outlet screens it will work downwardly, finally being discharged into the tank below, as will any water which is carried through the outlet screen onto the eliminator.

In addition, the water entrained in the screen will act to collect particles of dust and dirt carried with the air current, the screens thus having the additional function of washing the air, and since fresh spray water is continuously supplied, they are self-cleaning.

It will be observed that the present invention provides for the direct transfer of heat from the air to the cooling liquid not only by direct contact between the air and the liquid while the latter is in the form of spray particles and also after it has collected on or in the screens, but also for the indirect transfer of heat through the material of the screens, the latter absorbing heat from the air and in turn transmitting it to the water. As a result a very efficient and rapid absorption of heat is secured, permitting the use of an apparatus of small dimension and requiring the use and handling of a relatively small amount of water. For example, I have found by actual experience that by the use of the process and apparatus above described the same cooling and de-humidifying effect can be secured upon a given volume of air by apparatus less than one-quarter the size of that heretofore required. Also I have obtained the same results with the use of less than two-thirds the amount of water necessary in such prior apparatus.

In the accompanying drawings and the foregoing description I have shown and described the present invention as embodied in an apparatus for cooling or de-humidifying air, but the present invention is not necessarily limited to such use but may be employed for other purposes and in other connections as will be apparent to those skilled in the art. For example, it might be used for cooling a liquid, the latter being sprayed through the nozzles, while air at lower temperatures is passed through the apparatus. Thus, in connection with the use of the present invention for cooling and de-humidifying air, it is necessary to extract heat from the water which is employed for cooling the pump or compressor of the refrigerating apparatus which in turn cools the spray water or brine. This water may come from the compressor close to the boiling point, so that by spraying it through the nozzles into a stream of atmospheric air at ordinary temperature passing through the spray chamber, the temperature of the water will be quickly and efficiently reduced to permit its use again for cooling the compression pump.

From the above it is obvious that the present apparatus and process may be used for the cooling or heating of air or for the cooling or heating of liquid as desired, depending upon the relative temperatures of the air and liquid. The claims, therefore, are to be construed to cover all such uses except where otherwise specifically limited.

Nor is the present invention necessarily limited to use with air alone, for obviously in many of its aspects it is applicable for use with various other gaseous fluids as well as with different solutions, aqueous and otherwise. The claims, therefore, are to be construed to include by the term "air" any gaseous fluid and by the term "liquid" any liquid or solution, whether containing water or not.

It is also apparent that many features of the present invention are adapted for the humidification of air or the addition to or withdrawal from air or other gas of the vapor of liquids, such temperature changes as necessarily occur in connection therewith being taken care of in accordance with the method above set forth or in other suitable manner.

Nor is the present invention to be restricted to the specific form of parts herein shown and described, but may be employed in many other constructions and arrangements within the scope of the claims.

Having thus described the present invention, what is claimed is:

1. An apparatus for conditioning air comprising a plurality of superposed chambers each having an open bottom and an air inlet and an air outlet on opposite sides, means in each chamber for spraying cooling liquid therein, a common collecting tank secured to the bottom of the lowermost chamber for collecting the excess liquid from each chamber, a common inlet duct for the air inlets, and a common outlet duct for the air outlets.

2. A unit for air conditioning apparatus comprising side walls having connecting flanges at their top and bottom and at their front and rear to provide an open top and bottom and open front and rear, a screen adjacent the open front, a screen adjacent the open rear, and spraying devices positioned between the side walls and the front and rear screens.

3. Apparatus for conditioning air comprising a chamber through which air is horizontally passed, a screen in the inlet end of said chamber forming a chamber-wall and having a multiplicity of minute cellular interstices through which the air passes in finely divided streams, spraying devices in the chamber so located as to spray liquid forcibly against the inner surface of said chamber wall and in a direction opposite to the flow of air to break up the particles of the liquid into still finer particles on the surface of said chamber-wall and to cause the walls of the minute cells in said chamber-wall to be kept wet, to thereby effect intimate heat transfer contact between air and liquid in finely divided form within the body of said chamber-wall and further to cause a turbulential action within the chamber between the spraying devices and said chamber wall to thereby insure a further intimate contact between the air and the liquid spray before it passes the spraying devices, and another chamber-wall arranged behind the spraying devices so that all the partially cooled air will pass therethrough in making its exit from the chamber, this rear chamber wall being located sufficiently close to the spraying devices to be kept wet by the particles of water entrained in the outgoing air and being constructed with a multiplicity of minute cellular interstices through which the outgoing air passes, and draining means arranged at the lower end of the chamber to receive the drip falling from the lower edges of said two chamber walls and from the chamber itself.

SAMUEL M. ANDERSON.